(12) United States Patent
Ragucci

(10) Patent No.: US 7,714,861 B1
(45) Date of Patent: May 11, 2010

(54) METHOD OF PRODUCING ELECTRONICALLY READABLE DOCUMENTS WITH UPDATABLE PIE CHARTS

(75) Inventor: Salvatore Joseph Ragucci, Glendora, CA (US)

(73) Assignee: Information Builders Inc., New York, NY (US)

( * ) Notice: Subject to any disclaimer, the term of this patent is extended or adjusted under 35 U.S.C. 154(b) by 865 days.

(21) Appl. No.: 11/279,268

(22) Filed: Apr. 11, 2006

(51) Int. Cl.
*G06T 11/20* (2006.01)
(52) U.S. Cl. ........................ 345/440; 345/442
(58) Field of Classification Search .............. 345/440, 345/442
See application file for complete search history.

(56) References Cited

U.S. PATENT DOCUMENTS 5,442,741 A * 8/1995 Hughes et al. .............. 345/442

* cited by examiner

*Primary Examiner*—Chante Harrison
(74) *Attorney, Agent, or Firm*—Levine & Mandelbaum

(57) ABSTRACT

A method for drawing pie charts illustrating comparative data on the display of a client computer in a client-server environment with horizontal parallel lines each having a height of one pixel. A circular or elliptical pie is first defined in an array of endpoints of a set of horizontal lines from which the pie is constructed. Each slice of the pie is assigned a start angle and a stop angle as a function of the datum that it represents and its proximity to other slices. Pixels on the horizontal lines forming the pie are then tested to define segments of the horizontal lines for inclusion in the slices. The pixels of each line segment are illuminated on the display to form an image of a pie with each slice proportional in area to its respective datum.

16 Claims, 10 Drawing Sheets

METHOD OF PRODUCING ELECTRONICALLY READABLE DOCUMENTS WITH UPDATABLE PIE CHARTS

BACKGROUND OF THE INVENTION

The present invention provides a method for displaying a set of numerical data graphically on an Internet web page by creating a pie chart having "slices", each of which is proportional in size to the value of one datum.

More specifically the present invention teaches a method for affixing to a web page instructions for displaying numerical data in pie chart form and for updating the pie chart display in response to changes in the data.

The use of pie charts to make data comparisons is a technique known in the art. Long before the birth of personal computers and of the Internet, pie charts were drawn on paper, blackboards, and the like in order to enable an audience to readily compare numerically measurable attributes such as dollar expenditures and revenues, population distributions, and the like.

In a client-server environment in which the client communicates with the server over the Internet, it has been known to enable the client to transmit data entered on a web page to the server, and to receive back from the server instructions for drawing a pie chart representative of the data on the web page. However, when the client is working offline, i.e., disconnected from the server, the generation of a pie chart to illustrate the data on the web page in an efficient manner has not been possible.

Pie charts are made up of "slices" each of which represents one datum. Each slice has a circular or elliptical arc and two radii connecting the ends of the arc with the center of the circle or ellipse.

Web browsers typically deal with rectangular elements. Web technologies (HTML, CSS) do not provide built-in methods for creating non-rectangular shapes such as pie slices.

SUMMARY OF THE INVENTION

The present invention overcomes the aforementioned limitations of the prior art by providing a method of efficiently creating pie charts in Javascript®® which can then be displayed in any Javascript®-enabled web browser, such as Internet Explorer® or Firefox®.

It is therefore an object of the invention to attach to a web page instructions for constructing a pie chart illustrative of data entered on the web page without resort to a server or other external processor.

Another object of the invention is to efficiently construct a pie chart on a web page from segments of horizontal lines drawn on the web page.

Still another object of the invention is to construct a pie chart without computing the coordinates of each and every point in the pie chart.

Other and further objects of the invention will be apparent from the following drawings and description of a preferred embodiment of the invention.

DESCRIPTION OF THE PREFERRED EMBODIMENT

Figure 1:
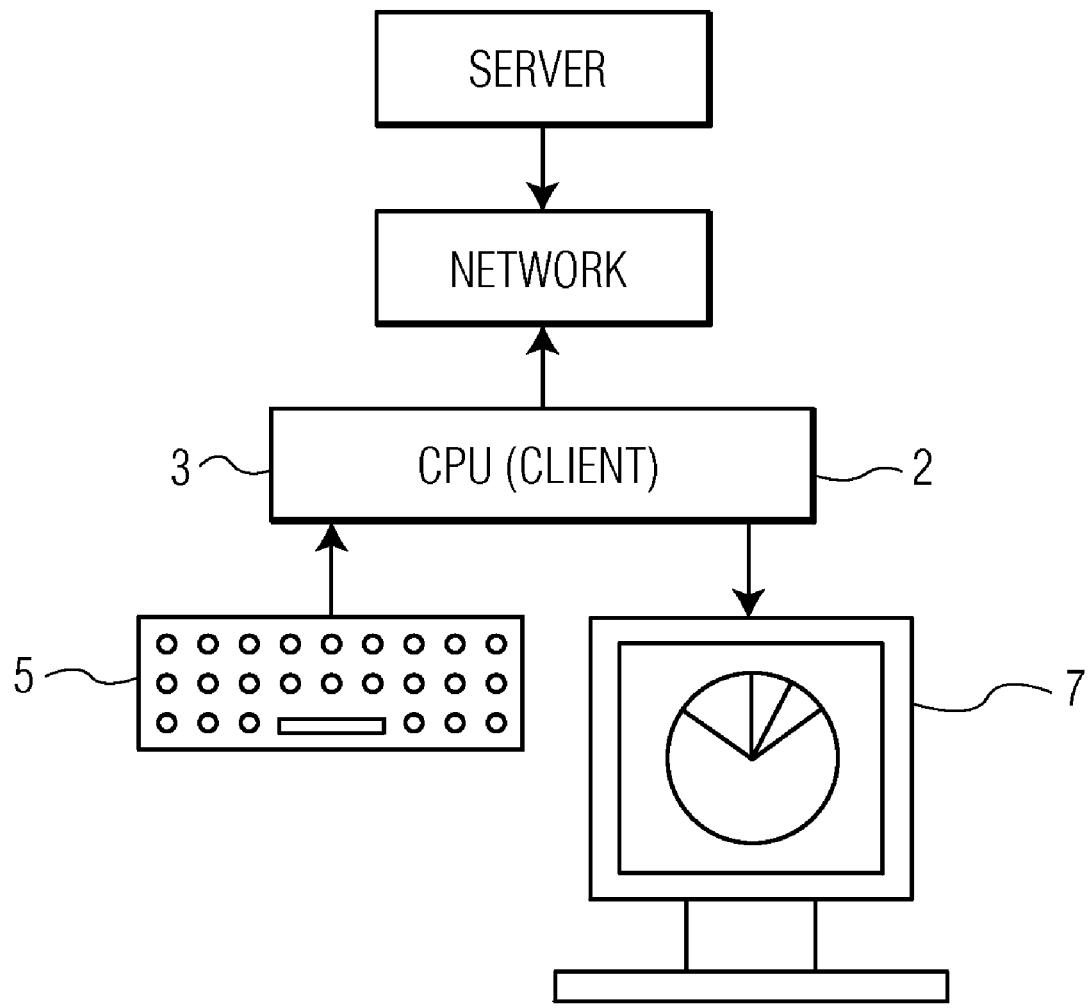
FIG. 1 is a schematic block diagram of apparatus for performing the method of the preferred embodiment of the invention.

Referring now to FIG. 1 of the drawings, there is shown a client computer 1 having a central processing unit (CPU) 3 which includes a microprocessor, RAM, ROM, and a rewritable data storage device in the form of a hard disk, a keyboard 5 for input of information to the CPU, and a video monitor 7 on which there is displayed a pie chart which graphically illustrates the relative magnitudes of the data in a data set having 4 members. Although not readily apparent to the eye, the pie chart and its slices are constructed from segments of horizontal lines of pixels on the display screen of the monitor, each segment being a rectangle with a height of one pixel.

In order to represent pie slices as collections of rectangles, two constraints must be observed. First, the outer, curved edge of each slice must correspond to the ideal circle (or ellipse) of the pie radius as closely as possible given the pixel resolution. Also the radial, i.e., straight boundaries of each slice n must intersect at an angle of $ANGLE_n$ degrees.

Two sets of calculations are made to construct a pie chart drawn with horizontal lines.

First, the end points of horizontal lines forming the entire pie chart, whether it be circular or elliptical, are determined and stored in an array in computer memory. By working only with the pixels included in the horizontal lines forming the overall pie, it is ensured that the outer, curved edge of each slice corresponds to the ideal circle (or ellipse) of the pie radius as closely as possible, given the pixel resolution.

Also, the calculations of the horizontal line end point coordinates for the entire pie are done only once, and are not repeated for each slice. This approach maximizes the speed of constructing the pie chart and enforces consistency of the circular boundaries from one slice to the next.

Thereafter, for each of the slices 0 to m, a determination of which pixels are included in the slice is made. The included pixels are then represented by a set of rectangles overlaying the horizontal lines forming the pie.

Irrespective of whether or not the pie is in the form of a circle or an ellipse, the determination of which pixels are included in each slice is computed by determining a start angle and a stop angle for each slice having a vertex at the center point of the pie.

In order to obtain a representation of all the pixels contained within the circle or ellipse, a modification of a scan conversion algorithm known in the art is applied as explained below.

The desired radius of the circular pie can be fixed in accordance with the framework of the web page, or it can be set with a data entry input to the client computer 1. The radius, measured in pixels, of the pie which is to be drawn is specified by the calling Javascript®.

Since circles exhibit eight-fold symmetry, it is only necessary to scan one eighth, or 45 degrees, of the circumference of a circular pie to define the complete set of pixels that represent the entire circular pie. It is not only more computationally efficient, but the resulting approximation of the true circle is automatically a symmetric one, which is usually more pleasing to the eye.

Prior art scan conversion algorithms for drawing circular objects find a point (x,y) in one 45 degree interval and map all 8 points that result from symmetries: (x,y); (x,-y); (-x, y); (-x,-y); (y,x); (y,-x); (-y, x); (-y,-x).

In accordance with the method of the invention, horizontal lines (rather than points) forming the circular pie are defined and the definitions are stored in an array, preferably in the random access memory of the client digital computer. That is, the coordinates of the end points of each horizontal line, i.e., a rectangle having a height of one pixel, are stored in the array of horizontal lines defining the circle.

Assuming that the pie is centered at the origin (0,0) of a rectangular coordinate system, the highest point on the pie will be at (0,R) where R is the radius of the circular pie.

The known Bresenham circle scan algorithm is used to determine from the radius of the desired circle which forms the circumference of the pie to be drawn, the coordinates of the right-most pixel on the top of the circle. One form of the Bresenham circle scan conversion algorithm which takes advantage of the 8-way symmetry of the circle has the following steps:

Start at a specific point, usually the center pixel at the top of the circle (x=0, y=R).

While x is less than y (in the North-NorthEast octant of the circle):

add the current point;

test to see whether the pixel to the right, or the pixel to the right and down, is closest to the true circle. If the pixel to the right is closest, move to the right by setting x=x+1 with y unchanged. If the pixel to the right and down is closest, move down and to the right by setting x=x+1 and y=y-1.

In accordance with the present invention, the Bresenham circle scan algorithm is modified so that before setting x=x+1 and y=y-1, x and y are saved as the coordinates of the right-most pixel on the circumference of the pie for the current y. From these x,y coordinates, a horizontal line of pixels terminating in the pixel having the current x,y coordinates is determined as are other horizontal lines in the pie which can be derived from symmetries inherent in the circular pie as follows.

First the endpoints of the lines having as x and y coordinates $[(-\alpha,R), (\alpha,R)]$ and $[(-\alpha,-R), (\alpha,-R)]$ are stored in the array of line endpoint coordinates where $\alpha$ is the x coordinate of the right-most pixel on the top of the circle and R is the radius of the desired circle which forms the circumference of the pie to be drawn. Also stored in the array of line endpoint coordinates are the lines $[(-\alpha,-R), (\alpha,-R)]$ and the N lines that result from exchanging the x and y coordinates and decrementing the y coordinate until it is equal to zero, where $N=(2\alpha+1)$, i.e., the length of the line $[(-\alpha,R), (\alpha,R)]$ measured in pixels. That is, the N stored horizontal lines include $\alpha$ lines above the x axis, $\alpha$ lines below the x axis, and one line coincident with the x axis for a total of $2\alpha+1$ lines. The horizontal lines above the x axis which are generated from the coordinates of the right-most pixel on the top of the circle are defined by the x,y coordinates of their end points as $[(-R,\alpha), (R,\alpha)], [(-R,\alpha-1), (R,\alpha-1)], [(-R,\alpha-2), (R,\alpha-2) \ldots [(-R,1), (R,1)]$.

The horizontal lines below the x axis which are generated from the coordinates of the right-most pixel on the top of the circle are $[(-R,-\alpha), (R,-\alpha)], [(-R,-(\alpha-1)), (R,-(\alpha-1)], [(-R,-(\alpha-2), (R,-(\alpha-2)] \ldots [(-R,-1), (R,-1)]$.

The results of the above, for a pie having a radius of 14 pixels, are shown in FIGS. 2-6. Note that the algorithm for this case has determined that the coordinates of the right-most pixel at the top of the pie are (3,14).

In order to begin to construct from horizontal lines or rectangles, the circular pie which is to be divided into slices, the following lines have their end point coordinates stored in an array in computer memory.

[(−3,14), (3,14)]
[(−3,−14), (3,−14)]
[(−14,3), (14,3)]
[(−14,2), (14,2)]
[(−14,1), (14,1)]
[(−14,0), (14,0)]
[(−14,−1), (14,−1)]
[(−14,−2), (14,−2)]
[(−14,−3), (14,−3)]

Figure 2:
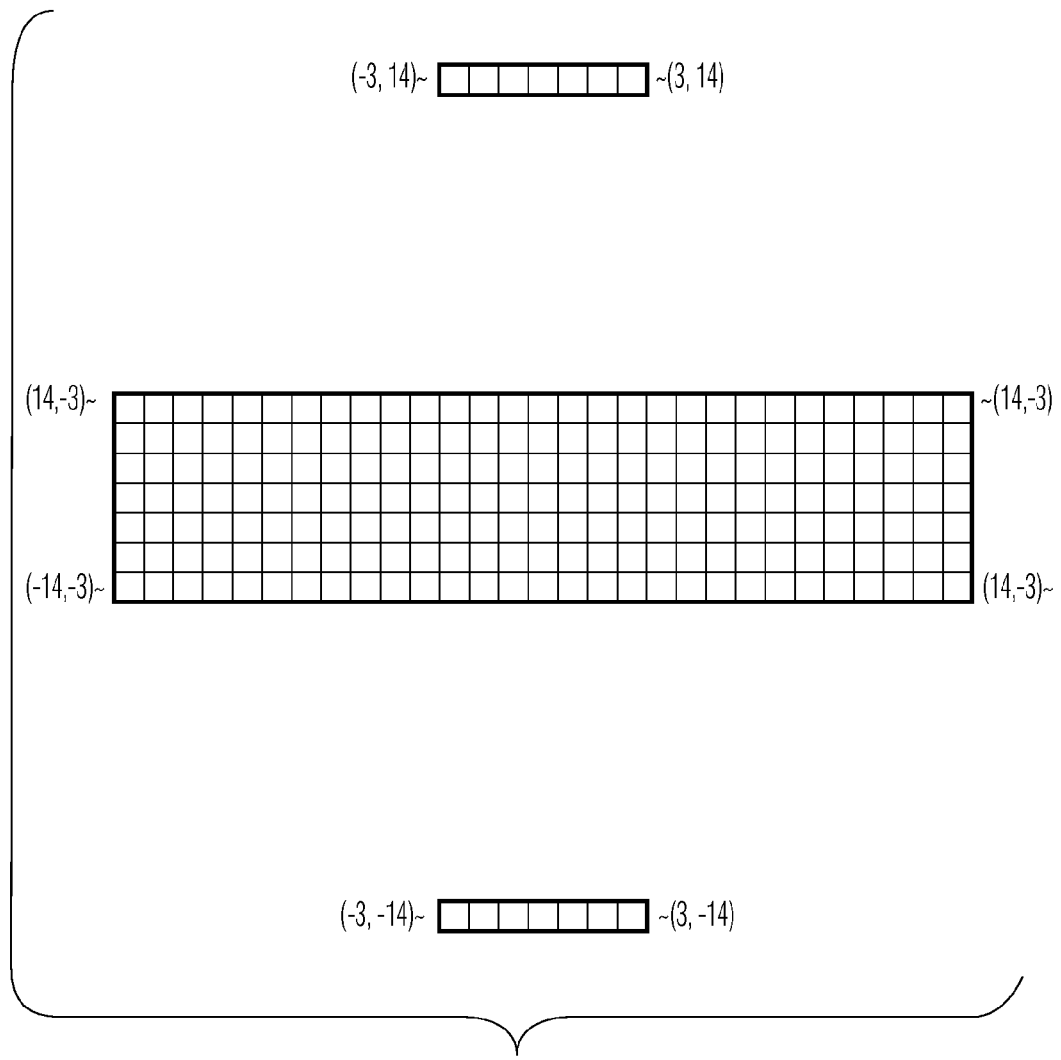
FIG. 2 is a view of the appearance of a display portion of the apparatus shown in FIG. 1 at a first time during performance of the method of the preferred embodiment of the invention.

The result of the foregoing is illustrated in FIG. 2.

The y-coordinate of the last determined right-most pixel of the pie is decremented by 1 to determine a new y-coordinate. The algorithm is again applied to determine the x-coordinate of the rightmost pixel of the pie having the new y-coordinate. In the example given, for a pie having a radius of 14 pixels, the rightmost pixel has the coordinates (6,13).

Figure 3:
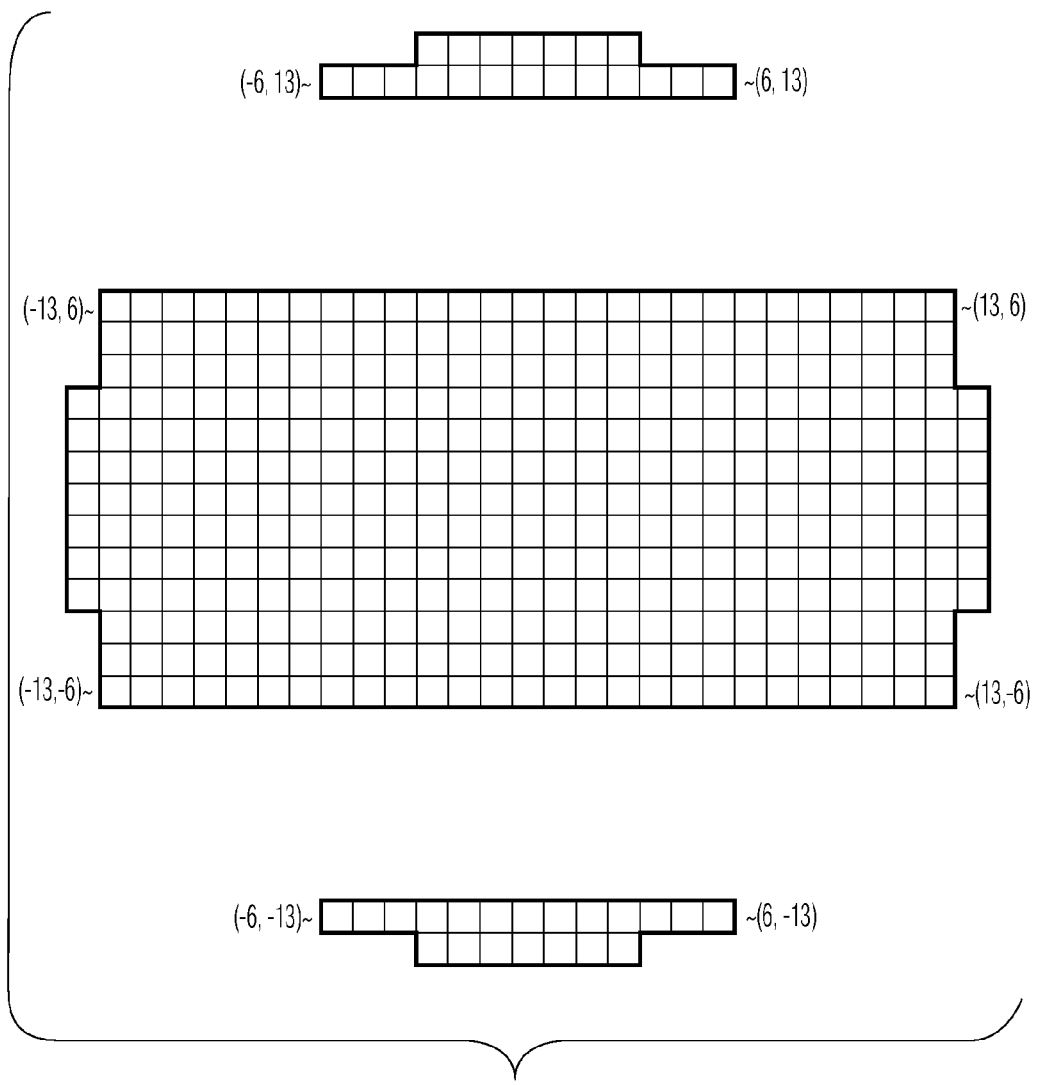
FIG. 3 is a view of the appearance of a display portion of the portion of the apparatus shown in FIG. 1 during performance of the method of the preferred embodiment of the invention at a time later than the time of FIG. 2.

Referring to FIG. 3, the above procedure is applied to determine the following lines, the end point coordinates of which are stored in the array.

[(−6,13), (6,13)]
[(−6,−13), (6,−13)]
[(−13,6), (13,6)]
[(−13,5), (13,5)]
[(−13,4), (13,4)]
[(−13,3), (13,3)]
[(−13,2), (13,2)]
[(−13,1), (13,1)]
[(−13,0), (13,0)]
[(−13,−1), (13,−1)]
[(−13,−2), (13,−2)]
[(−13,−3), (13,−3)]
[(−13,−4), (13,−4)]
[(−13,−5), (13,−5)]
[(−13,−6), (13,−6)]

If more than one scan line is produced for the same y-coordinate, the coordinates of the end points of the longest line are stored and the coordinates of the end points of the shorter lines are discarded.

Each time that a new right-most x-coordinate is determined for a new decremented y-coordinate, a comparison is made between the new x-coordinate and y-coordinate to determine whether the new right-most pixel is within the 45 degrees measured along the circumference of the circle clockwise from the positive y-axis. As long as the x-coordinate of the rightmost pixel is less than the y-coordinate of the rightmost pixel, the rightmost pixel is used to generate and store a further set of horizontal lines after which the y-coordinate of the last right-most pixel in the pie is decremented by 1 and a new right-most pixel is determined.

Once the comparison discloses that the x-coordinate of the rightmost pixel is greater than the y-coordinate of the rightmost pixel, this procedure is halted as all of the horizontal lines necessary to draw the pie are produced after 45 degrees of the circumference of the pie have been covered. If the comparison discloses that the x-coordinate of the rightmost pixel is equal to the y-coordinate of the rightmost pixel, the pixel is included in the pie and a corresponding horizontal line is determined.

The y-coordinate of the last determined right-most pixel of the pie is, again, decremented by 1 to determine a new y-coordinate, i.e., 13−1=12. The algorithm is applied to determine the x-coordinate of the rightmost pixel of the pie having the new y-coordinate. In the example given, x coordinate of the right-most point on the line is found to be 7.

Figure 4:
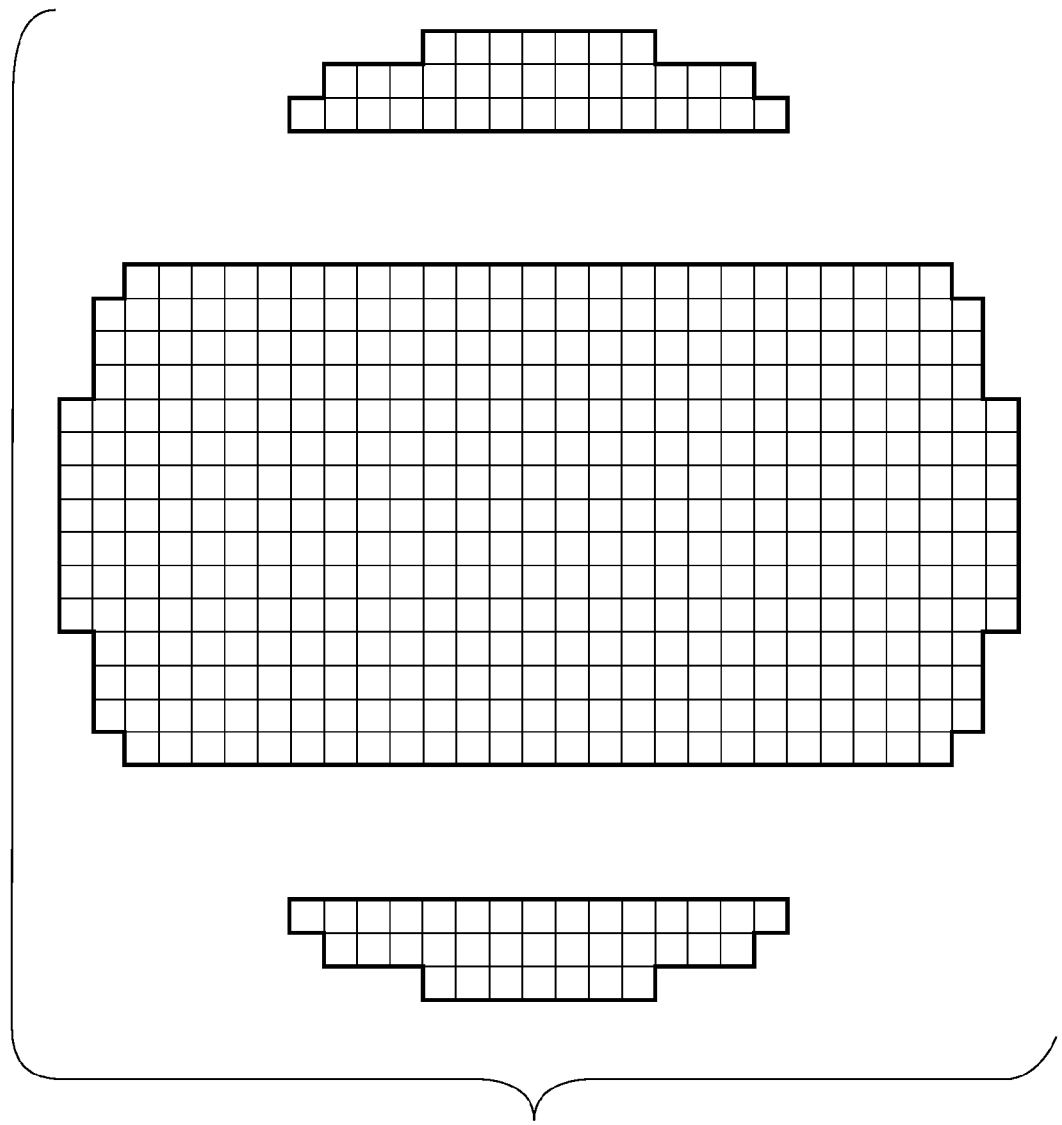
FIG. 4 is a view of the appearance of a display portion of the portion of the apparatus shown in FIG. 1 during performance of the method of the preferred embodiment of the invention at a time later than the time of FIG. 3.

Referring to FIG. 4, the above procedure is applied to determine the following lines, the end point coordinates of which are stored in the array.

[(−7,12), (7,12)]
[(−7,−12), (7,−12)]
[(−12,7), (12,7)]
[(−12,6), (12,6)]
[(−12,5), (12,5)]
[(−12,4), (12,4)]
[(−12,3), (12,3)]
[(−12,2), (12,2)]
[(−12,1), (12,1)]
[(−12,0), (12,0)]
[(−12,−1), (12,−1)]
[(−12,−2), (12,−2)]
[(−12,−3), (12,−3)]
[(−12,−4), (12,−4)]
[(−12,−5), (12,−5)]
[(−12,−6), (12,−6)]
[(−12,−7), (12,−7)]

If more than one scan line is produced for the same y-coordinate, the coordinates of the end points of the longest line are stored and the coordinates of the end points of the shorter lines are discarded.

The y-coordinate of the last determined right-most pixel of the pie is, again, decremented by 1 to determine a new y-coordinate, i.e., 12−1=11. The algorithm is applied to determine the x-coordinate of the rightmost pixel of the pie having the new y-coordinate. In the example given, x coordinate of the right-most point on the line is found to be 9.

Figure 5:
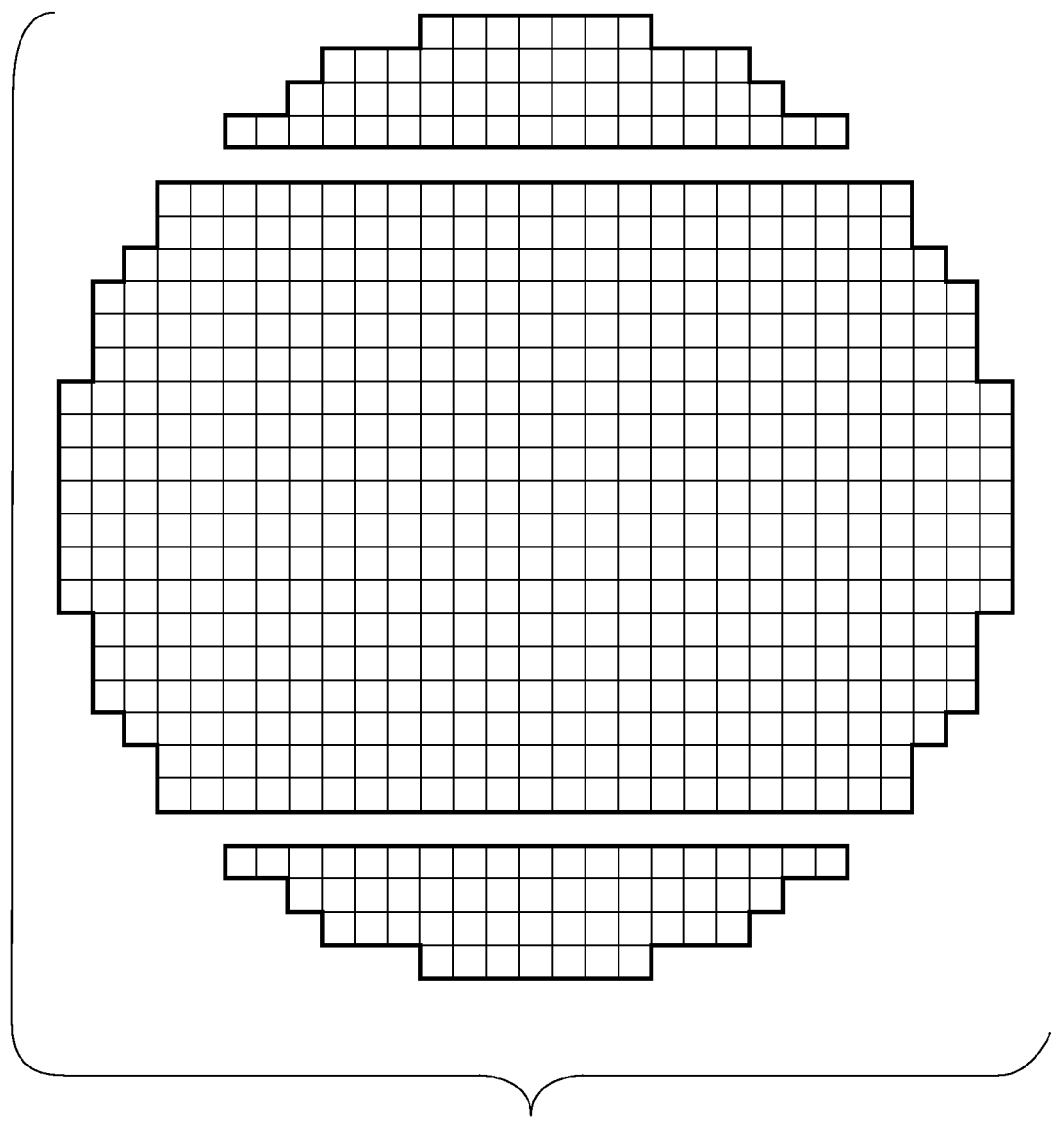
FIG. 5 is a view of the appearance of a display portion of the portion of the apparatus shown in FIG. 1 during performance of the method of the preferred embodiment of the invention at a time later than the time of FIG. 4.

Referring to FIG. 5, the above procedure is applied to determine the following lines, the end point coordinates of which are stored in the array.

[(−9,11), (9,11)]
[(−9,−11), (9,−11)]
[(−11,9), (11,9)]
[(−11,8), (11,8)]
[(−11,7), (11,7)]
[(−11,6), (11,6)]
[(−11,5), (11,5)]
[(−11,4), (11,4)]
[(−11,3), (11,3)]
[(−11,2), (11,2)]
[(−11,1), (11,1)]
[(−11,0), (11,0)]
[(−11,−1), (11,−1)]
[(−11,−2), (11,−2)]
[(−11,−3), (11,−3)]
[(−11,−4), (11,−4)]
[(−11,−5), (11,−5)]
[(−11,−6), (11,−6)]
[(−11,−7), (11,−7)]
[(−11,−8), (11,−8)]
[(−11,−9), (11,−9)]

If more than one scan line is produced for the same y-coordinate, the coordinates of the end points of the longest line are stored and the coordinates of the end points of the shorter lines are discarded.

The y-coordinate of the last determined right-most pixel of the pie is, again, decremented by 1 to determine a new y-coordinate, i.e., 11−1=10. The algorithm is applied to determine the x-coordinate of the rightmost pixel of the pie having the new y-coordinate. In the example given, x coordinate of the right-most point on the line is found to be 10.

Figure 6:
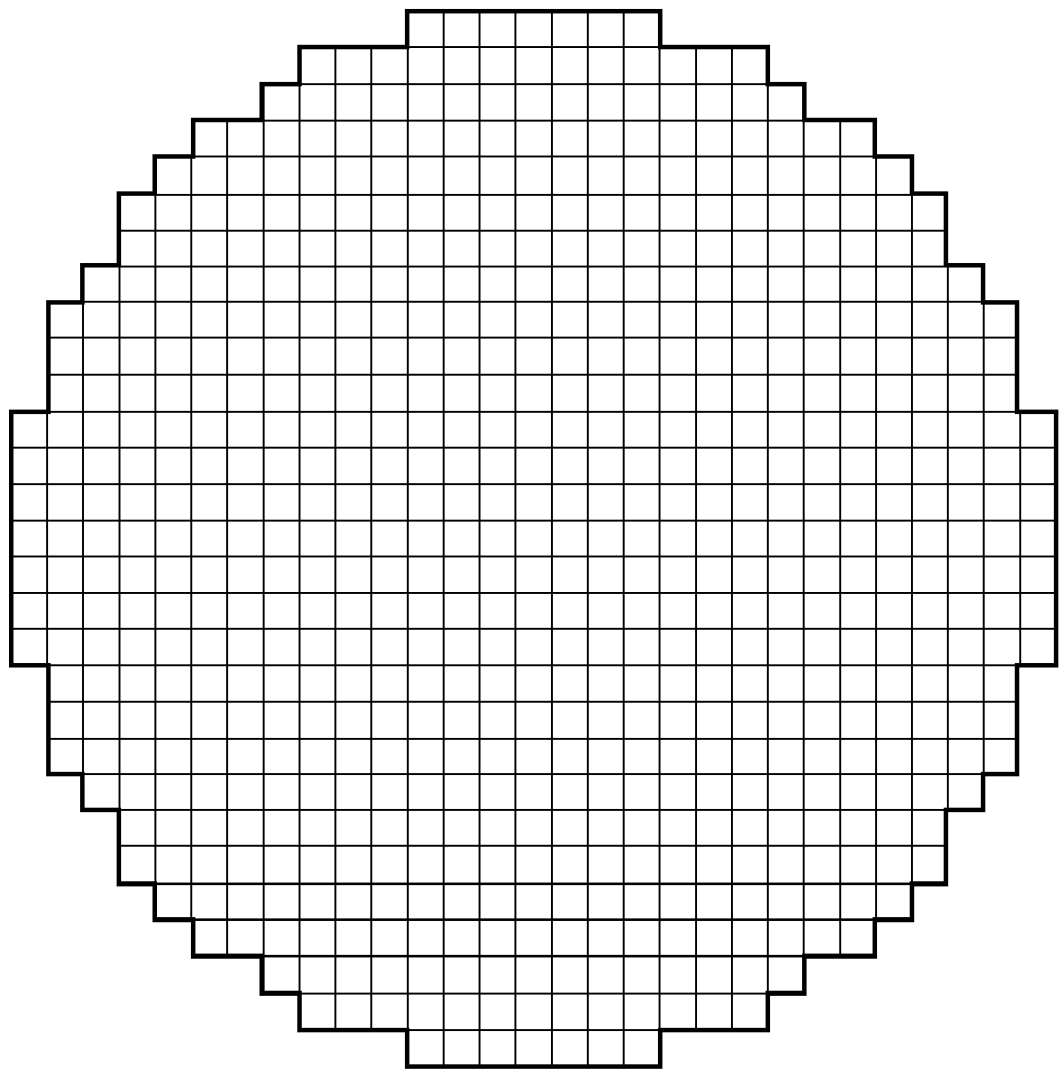
FIG. 6 is a view of the appearance of a display portion of the portion of the apparatus shown in FIG. 1 during performance of the method of the preferred embodiment of the invention at a time later than the time of FIG. 5.

Referring to FIG. 6, the above procedure is applied to determine the following lines, the end point coordinates of which are stored in the array.

[(−10,10), (10,10)]
[(−10,−10), (10,−10)]
[(−10,10), (10,10)]
[(−10,9), (10,9)]
[(−10,8), (10,8)]
[(−10,7), (10,7)]
[(−10,6), (10,6)]
[(−10,5), (10,5)]
[(−10,4), (10,4)]
[(−10,3), (10,3)]
[(−10,2), (10,2)]
[(−10,1), (10,1)]
[(−10,0), (10,0)]
[(−10,−1), (10,−1)]
[(−10,−2), (10,−2)]
[(−10,−3), (10,−3)]
[(−10,−4), (10,−4)]
[(−10,−5), (10,−5)]
[(−10,−6), (10,−6)]
[(−10,−7), (10,−7)]
[(−10,−8), (10,−8)]
[(−10,−10), (10,−10)]

If more than one scan line is produced for the same y-coordinate, the coordinates of the end points of the longest line are stored and the coordinates of the end points of the shorter lines are discarded.

Each time that a new right-most x-coordinate is determined for a new decremented y-coordinate, a comparison is made between the new x-coordinate and y-coordinate to determine whether the new right-most pixel is within the 45 degrees measured along the circumference of the circle clockwise from the positive y-axis. As long as the x-coordinate of the rightmost pixel is less than or equal to the y-coordinate of the rightmost pixel, the rightmost pixel is used to generate and store a further set of horizontal lines after which the y-coordinate of the last right-most pixel in the pie is decremented by 1 and a new right-most pixel is determined.

Once the comparison discloses that the x-coordinate of the rightmost pixel is greater than the y-coordinate of the rightmost pixel, this procedure is halted as all of the horizontal lines necessary to draw the pie are produced after 45 degrees of the circumference of the pie have been covered as can be seen in FIG. 6.

It is sometimes desirable to create the illusion of looking at the pie chart from an angle, which can be accomplished by drawing the pie slices on an ellipse aligned with its major axis along the X-axis. Unlike circles which exhibit eight-fold symmetry, ellipses exhibit only four-fold symmetry. Hence, when the pie to be drawn is elliptical but not circular, it is necessary to continue the above described cycle through a scan of 90 degrees of the ellipse. The cycle by which the end point coordinates of the lines necessary to draw the elliptical pie are determined and stored in an array continues after the magnitude of the x-coordinate exceeds that of the y-coordinate and until the y-coordinate is equal to zero.

As before, when a pixel (x,y) is determined to be a rightmost pixel on the ellipse, the lines [(-x,y), (x,y)] and [(-x,-y), (x,-y)] are stored in the array in memory. No exchange of x and y is possible in the case of an ellipse. However, since the entire first quadrant, i.e., 90 degrees of the ellipse, is scanned, the exchange of coordinates is not necessary to determine all of the horizontal lines needed to draw the ellipse.

Once the array of horizontal line end point coordinates is completed it can remain in storage and need not be recalculated while the web page remains loaded, i.e., the array need only be calculated once.

Having defined the pie as a group of horizontal lines, the pixels contained within each slice of the pie are then calculated, using the array of horizontal lines and the angles which define the slice.

The angles at which the radial boundaries of each of the slices intersect at the center of the pie are calculated from an array of data values $[a_0, a_1, a_2, \ldots a_n]$ which are to be represented in the pie chart to be drawn as follows.

First the 360 degrees of arc forming the circumference of the pie chart are subdivided into arcs proportional in length to the magnitudes of the data. Radii extending from the center of the circular pie to the end points of each arc form slices proportional in size to the magnitudes of the data. Each datum $a_i$ is replaced by its absolute value to avoid problems associated with negative values in pie charts.

The magnitudes of the data are added to compute their total, T.

$$T = a_0 + a_1 + \ldots + a_n$$

Datum values which are less than the smallest value to be represented by a pie slice, i.e., the threshold value (typically set to between 1% and 5% of the total), are combined by adding their values to obtain a sum to be represented by a single slice denoted "Other" if the data set $[|a_i|]$ contains more than one such small slice. This processing can be avoided if desired, by setting the threshold for inclusion in the "Other" slice to zero.

Consider a modified data set $[b_0, b_1, \ldots b_m]$, where $b_m$ is the total of all the "too-small" slices which are to be combined into a single a slice, and each of the $b_i$ up to $b_{m-1}$ are the "large enough" absolute values each of which is to be represented in the pie by its own slice.

For each of the $b_i$, the percent of the total is computed as follows:

$$p_i = b_i / T \times 100\%$$

These percentages are stored in an array $[p_1 \ldots p_m]$, preferably in computer memory.

The start and stop angles for each slice of the pie chart to be drawn are derived from the array of percentages $[p1 \ldots pm]$. Since the complete pie is 360 degrees, or 2D radians, the angular size for the nth slice is computed in radians as ANGLEn=pn*360 degrees=pn*2D radians.

To adhere to the convention for business-oriented pie charts, $SLICE_0$ (the slice representing value $b_0$) starts at 90 degrees, i.e., at the positive y-axis, and extends clockwise for $ANGLE_0$ degrees, ending at (90–$ANGLE_0$) degrees. For programming purposes, it is easier to have the first slice, i.e., slice 0, begin at 90–$ANGLE_0$ degrees and extend counterclockwise $ANGLE_0$ degrees, ending at 90 degrees. That is, the radius of the pie which coincides with one edge of the first slice to be drawn intersects the Y-axis at an angle of $START_0$ degrees where START$_0$ degrees=(90 degrees–ANGLE$_0$ degrees)

The radius of the pie which coincides with the other edge of the first slice to be drawn intersects the Y-axis at an angle of $STOP_0$ degrees where STOP$_0$=90 degrees.

Subsequent angles are obtained by accumulation of angles:

Slice 1 (the slice representing value $b_1$) has the following start and stop angles.

STOP$_1$=START$_0$;

START=STOP$_1$–ANGLE$_1$.

Slice i (the slice representing value $b_i$) has the following start and stop angles.

STOP$_i$=START$_{i-1}$;

START$_i$=STOP$_i$–ANGLE$_i$.

By the nature of pie charts, the start angle of slice (i+1) is the stop angle of slice i. By using each slice's start angle as the stop angle for the succeeding slice, the number of necessary computations can be minimized and rounding errors that occur if the percentages are simply accumulated, and start and stop angles for each slice are independently calculated, can be avoided.

The angles of intersection for the radii bordering each slice are stored in arrays of [START] and [STOP] whereby the angles can be used to construct the pie slices.

Since each slice must be within the confines of the circle or ellipse which has been defined as a series of horizontal lines, the pixels of each slice can be identified by testing the pixels in each horizontal line for presence in each slice as follows.

Starting at the leftmost pixel of the uppermost horizontal line of the pie which is stored within the array of lines defining the pie, the coordinates of the pixel are tested for presence within a slice of the pie having a stop angle and a start angle by subjecting them to the following calculations:

Let:

xp1=1000*cos(start angle);

yp1=1000*sin(start angle);

xp2=1000*cos(stop angle);

yp2=1000*sin(stop angle).

1) If y*xp1>=x*yp1, then the point (x,y) is counterclockwise from the start angle.

2) If y*xp2<=x*yp2, then the point (x,y) is clockwise from the stop angle.

In order for a point to be within a slice occupying less than 50 percent of the pie, i.e., with an angle <=180 degrees, both of relationships 1) and 2) above must be true.

For slices which represent values greater than 50 percent of the total of the values represented by the pie, i.e., subtending an angle of more than 180 degrees, at least one of relationships 1) and 2) must be true for the point (x,y) to belong to the slice.

Since Javascript® is a relatively slow interpreted language, it is desirable to avoid repetitive time consuming calculations using sine and cosine functions. Hence, sin(start angle), cos(start angle), sin(stop angle) and cos(stop angle) are computed once for each slice. Those values are then used repeatedly to determine whether each pixel in the pie is in the slice bordered by radii respectively having the start angle and stop angle.

To further minimize processing time, floating point calculations are avoided by multiplying the results of the sin(start), cos(start angle), sin(stop) and cos(stop) calculations by 1000 and rounding them to integers. It is then possible to use integer multiplication, which is faster than floating point multiplication, to determine whether a given pixel is counterclockwise from the start angle and clockwise from the stop angle, in which case it is within the slice.

If a pixel is found not to be within the slice for which pixel presence is being tested, the pixel to the right of the tested pixel found not to be within the slice is subjected to the same test. Each pixel to the right of a pixel found not to be within the slice is tested in the same manner until either one of two events.

If the rightmost pixel on the horizontal line is reached and upon being tested is found not to be within the slice, the entire horizontal line is segregated from the horizontal lines to be used in drawing the slice.

If the test of a pixel on the horizontal line for presence within the slice is positive, the coordinates of the pixel are stored, and the next pixel to be tested for inclusion in the slice is the rightmost pixel on the same horizontal line. If the rightmost pixel is not within the slice, the pixel to the left of the last tested pixel found not to be within the slice is subjected to the same test. Each pixel to the left of a pixel found not to be within the slice is tested in the same manner until a pixel tests positive for inclusion within the slice. The coordinates of the leftmost pixel and rightmost pixel on the horizontal line within the slice are stored.

Thereafter, starting at the leftmost pixel of the horizontal line of the pie next beneath the top horizontal line, the cycle continues with the coordinates of each tested pixel being subjected to the calculation above.

Again, if the rightmost pixel on the horizontal line is reached and upon being tested is found not to be within the slice, the entire horizontal line is segregated from the horizontal lines to be used in drawing the slice. Otherwise, after a pixel tests positive for inclusion in the slice, processing continues at the rightmost pixel on the same horizontal line of the pie as before.

The foregoing procedure continues for each slice from the topmost horizontal line forming the pie through the bottommost horizontal line forming the pie. With the completion of the procedure for each slice, the x coordinates of the end pixels of all of the horizontal lines forming the slice, and the Y coordinate of the line are stored in an array in computer memory. These three coordinates define a clipped scan line of the pie which will be included in the respective slice.

In cases where a slice has radial borders which intersect at an angle greater than 180 degrees, two discontinuous segments of each horizontal line of the pie, either above or below the x-axis depending on the orientation of the slice, must be included in the slice, i.e., the slice cannot be represented by a series of single horizontal scan lines. This occurs when the slice occupies more than half the pie and is either a) at the bottom of the pie with both sides rising above the horizontal center line of the pie; or b) at the top of the slice with both sides dropping below the horizontal center line. In these cases, the y-values rising above or dropping below the center line must be represented by two scan lines each, one for the left side and one for the right side of the slice.

Before processing of the horizontal scan lines of the pie begins to determine the coordinates of the clipped line(s) to be included in each slice the pie, the start and stop angles for each slice of the pie are tested to see if their difference is greater than 180 degrees and, if so, whether or not both angles are above or below the horizontal centerline (X-axis) of the pie.

If the slice's start angle is in the first quadrant of the pie, i.e., the start angle is >=0 degrees and <=90 degrees and its stop angle is in the fourth quadrant, i.e., the stop angle is >270 degrees and <=360 degrees, the slice subtends and angle of more than 180 degrees and fills the entire bottom half of the circular pie. For positive Y-values, 2 spaced horizontal line segments may be needed for each Y-value.

If the slice's start angle is in the third quadrant of the pie, i.e., the start angle is >180 degrees and <=270 degrees and its stop angle is in the second quadrant of the pie, i.e., the stop angle is >90 degrees and <=180 degrees, the slice subtends and angle of more than 180 degrees and fills the entire top half of the circular pie. For negative Y-values, 2 spaced horizontal line segments may be needed for each Y-value.

If neither condition applies, the slice never needs more than one continuous horizontal line for a given Y-value.

In the case of a slice found to require two horizontal line segments within each horizontal line of the pie, the above procedure is modified as follows.

First the above method for finding the leftmost and rightmost pixels in a slice which is wholly above or wholly below the x-axis is performed. If both the leftmost and rightmost pixel are on the same side of the y-axis, i.e., the x coordinates of both the leftmost and rightmost pixels are <=0, or the x coordinates of both the leftmost and rightmost pixels are >=0), then there is only one horizontal line for this Y-value. Since the leftmost and rightmost pixels that define the line are already known, the line is defined as [leftmost, rightmost, Y-value] and the foregoing method is then applied for the next Y-value.

If the leftmost and rightmost pixels are on the different sides of the Y-axis, i.e., the x coordinate of the leftmost pixel is <=0 and the x coordinate of the rightmost pixel is >=0, or the x coordinate of the leftmost pixel is >=0 and the x coordinate of the rightmost pixel is <=0, then two spaced horizontal line segments are required for the y-value.

If the leftmost pixel for the Y-value is <=0 and the rightmost pixel is >=0 there will be two horizontal line segments for the Y-value, one on the left half (its pixels will all have x<=0) and one on the right half (its pixels will all have x>=0). It then remains necessary to determine the rightmost pixel in the left-half line segment and the leftmost pixel in the right-half line segment.

The rightmost pixel in the left-half line segment is determined by starting at x=0 and moving to the left. The first pixel found to be in the slice, which could be x=0 itself, will be the rightmost pixel in the left-half line segment. The left-half line segment is then defined as [leftmost, rightmost-left-half, Y-value].

The leftmost pixel in the right-half line segment is found by starting at x=1 and moving to the right. The first pixel we found to be in the slice, which could be x=1 itself, is the leftmost pixel in the right-half line segment. The right-half line segment is then defined as [leftmost, rightmost-left-half, Y-value].

An alternative modification of the procedure is as follows.

If the start and stop angles of the slice are in the upper half of the pie, i.e., above the horizontal centerline of the slice or above the x-axis, the following takes place.

Starting at the leftmost pixel of the uppermost horizontal line of the pie which is stored within the array of lines defining the pie, the coordinates of the pixel are tested to determine whether the pixel is in the slice.

If the pixel is not within the slice, the pixel to the right of the tested pixel found not to be within the slice is subjected to the same test. Each pixel to the right of a pixel found not to be within the slice is tested in the same manner until either one of two events.

As in the case where only one segment of a horizontal line of the pie is required in the slice, if the rightmost pixel on the horizontal line is reached and upon being tested is found not to be within the slice, the entire horizontal line is segregated from the horizontal lines to be used in drawing the slice.

If the test of a pixel on the horizontal line for presence within the slice is positive, the x coordinate of the pixel is stored, and each pixel to the right of the pixel found to be within the slice is sequentially tested until a pixel on the horizontal line is found not to be within the slice. The x coordinate for the last pixel found to be within the slice is stored and the next pixel to be tested for inclusion in the slice is the rightmost pixel of the pie on the same horizontal line.

If the rightmost pixel is not within the slice, the pixel to the left of the last tested pixel found not to be within the slice is subjected to the same test. Each pixel to the left of a pixel found not to be within the slice is tested in the same manner until a pixel tests positive for inclusion within the slice. The x coordinate of the pixel which tested positive is stored, and each pixel to the left of the pixel found to be within the slice is sequentially tested until a pixel on the horizontal line is found not to be within the slice. The x coordinate for the last pixel found to be within the slice is stored.

The four X coordinates which have been stored, along with the Y coordinate of the horizontal line define the endpoints of two segments of the horizontal line which are within the slice.

Thereafter, starting at the leftmost pixel of the next lower horizontal line of the pie, the cycle continues until the center horizontal line in the pie (having a Y coordinate of 0) has been tested for pixels to be included in the slice.

Processing of the pixels in horizontal lines below the horizontal centerline continues in the same fashion as when a slice subtends and angle of less than 180 degrees. That is after the leftmost pixel of the slice is located, the next pixels to be processed are the rightmost pixel on the same horizontal line of the pie and successive pixels to the left until the rightmost pixel on the line is identified. During processing of pixels on horizontal lines below the horizontal centerline, only two x coordinates are stored for each line as only a single continuous segment of the line will be included in the slice.

Again, if the rightmost pixel on the horizontal line is reached and upon being tested is found not to be within the slice, the entire horizontal line is segregated from the horizontal lines to be used in drawing the slice. Otherwise, after a pixel tests positive for inclusion in the slice, processing continues at the rightmost pixel on the same horizontal line of the pie as before.

If the start and stop angles of the slice are in the lower half of the pie, i.e., below the horizontal centerline of the slice, processing of the pixels in horizontal lines above the horizontal centerline begins at the left end of the uppermost left horizontal line in the pie in the same fashion as when a slice subtends and angle of less than 180 degrees. That is after the leftmost pixel of the slice is located, the next pixels to be processed are the rightmost pixel on the same horizontal line of the pie and successive pixels to the left until the rightmost pixel on the line is identified. During processing of pixels on horizontal lines above the horizontal centerline, only two x coordinates are stored for each line as only a single continuous segment of the line will be included in the slice. If the rightmost pixel on the horizontal line is reached and upon being tested is found not to be within the slice, the entire horizontal line is segregated from the horizontal lines to be used in drawing the slice. Otherwise, after a pixel tests positive for inclusion in the slice, processing continues at the rightmost pixel on the same horizontal line of the pie as before.

Processing to locate pixels in the slice within each horizontal line in the pie continues from line to line, downwardly, until the center horizontal line is processed. Thereafter, starting at the leftmost pixel of the first horizontal line of the pie below the center horizontal line, the coordinates of the pixel are tested to determine whether the pixel is in the slice.

If the pixel is not within the slice, the pixel to the right of the tested pixel found not to be within the slice is subjected to the same test. If the test is positive, i.e., the pixel is within the slice, the x coordinate of the pixel is stored, and each pixel to the right of the pixel found to be within the slice is sequentially tested until a pixel on the horizontal line is found not to be within the slice. The x coordinate for the last pixel found to be within the slice is stored and the next pixel to be tested for inclusion in the slice is the rightmost pixel of the pie on the same horizontal line.

If the rightmost pixel is not within the slice, the pixel to the left of the last tested pixel found not to be within the slice is subjected to the same test. Each pixel to the left of a pixel found not to be within the slice is tested in the same manner until a pixel tests positive for inclusion within the slice. The x coordinate of the pixel which tested positive is stored, and each pixel to the left of the pixel found to be within the slice is sequentially tested until a pixel on the horizontal line is found not to be within the slice. The x coordinate for the last pixel found to be within the slice is stored.

The four X coordinates which have been stored, along with the Y coordinate of the horizontal line define the endpoints of two segments of the horizontal line which are within the slice.

Thereafter, starting at the leftmost pixel of the next lower horizontal line of the pie, the cycle continues until the lowermost (bottom) horizontal line in the pie has been tested for pixels to be included in the slice.

EXAMPLE

Consider the data set 1, 1, 8, 2 which is to be illustrated in a pie chart. From the foregoing, the angles of the slices which will illustrate the data are:

1/12*360 degrees=30 degrees

1/12*360 degrees=30 degrees

8/12*360 degrees=240 degrees

2/12*360 degrees=60 degrees

The start and stop angles of the slices are computed as follows.

$STOP_0$=90 degrees

Figure 7:
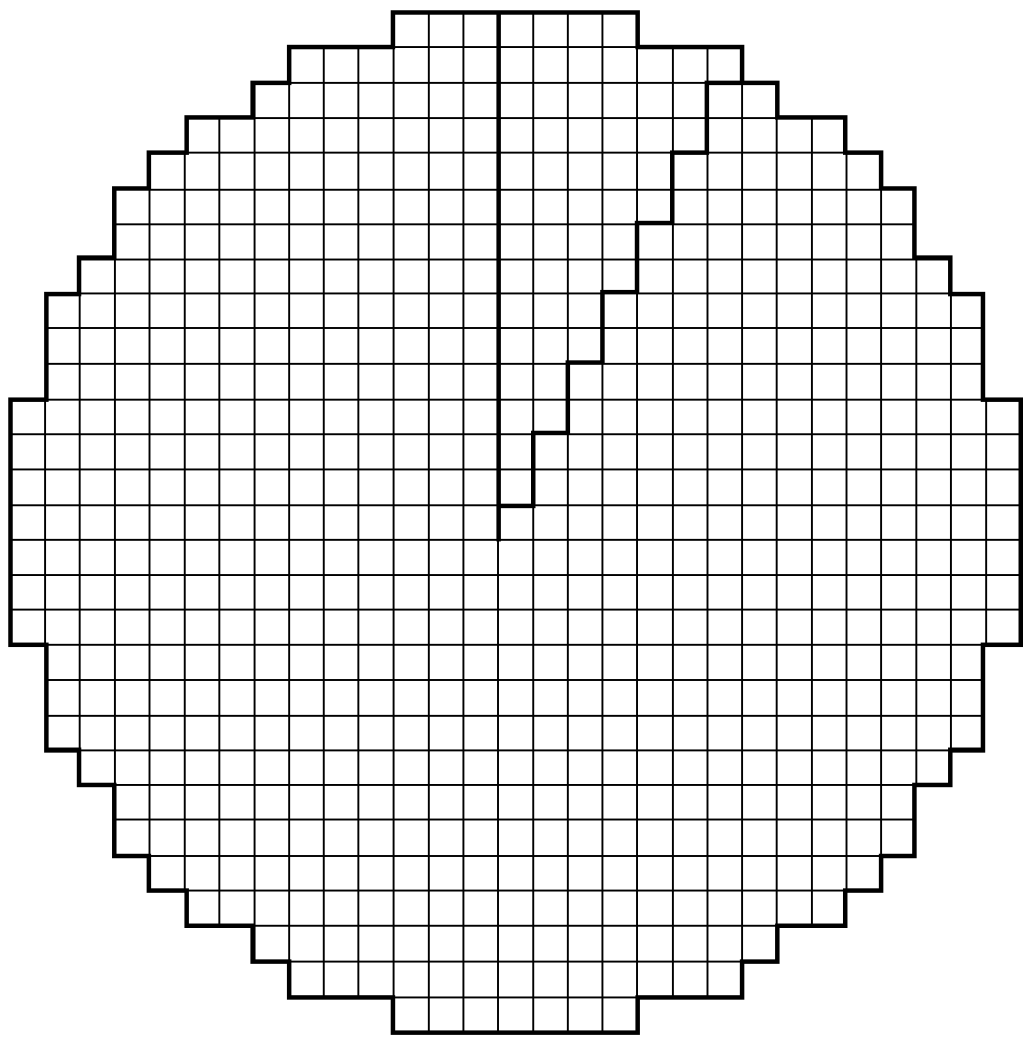
FIG. 7 is a view of the appearance of a display portion of the portion of the apparatus shown in FIG. 1 during performance of the method of the preferred embodiment of the invention at a time later than the time of FIG. 6.

As shown in FIG. 7, slice 1 (the slice representing first value 1) has the following start and stop angles.

$STOP_1=START_0=90$ degrees $START_1=STOP_1-ANGLE_1=90-30=60$ degrees

Figure 8:
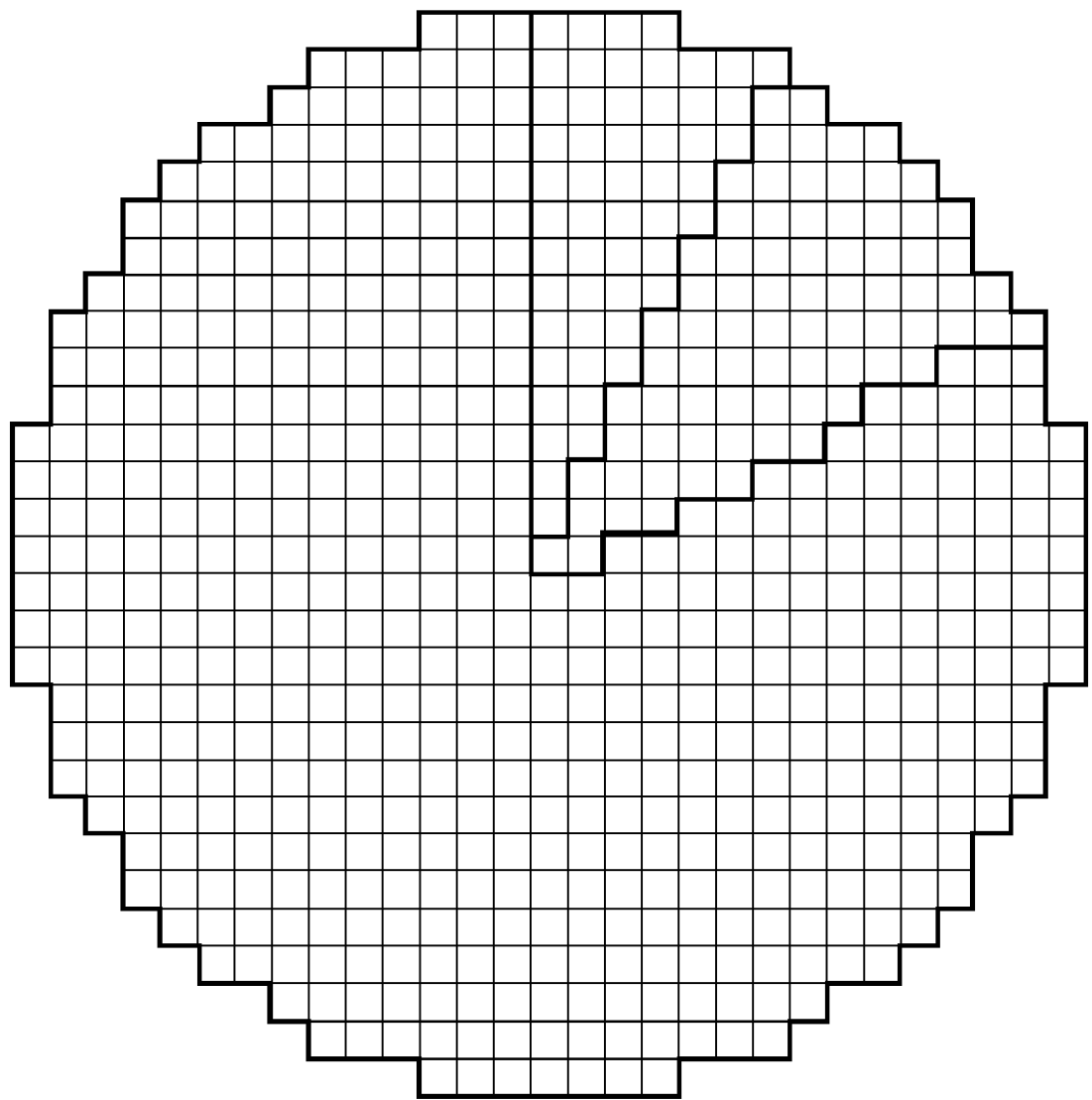
FIG. 8 is a view of the appearance of a display portion of the portion of the apparatus shown in FIG. 1 during performance of the method of the preferred embodiment of the invention at a time later than the time of FIG. 7.

As shown in FIG. 8, slice 2 (the slice representing second value 1) has the following start and stop angles.

$STOP_2=START_1=60$ degrees $START_2=STOP_2-ANGLE_2=60-30=30$ degrees

Figure 9:
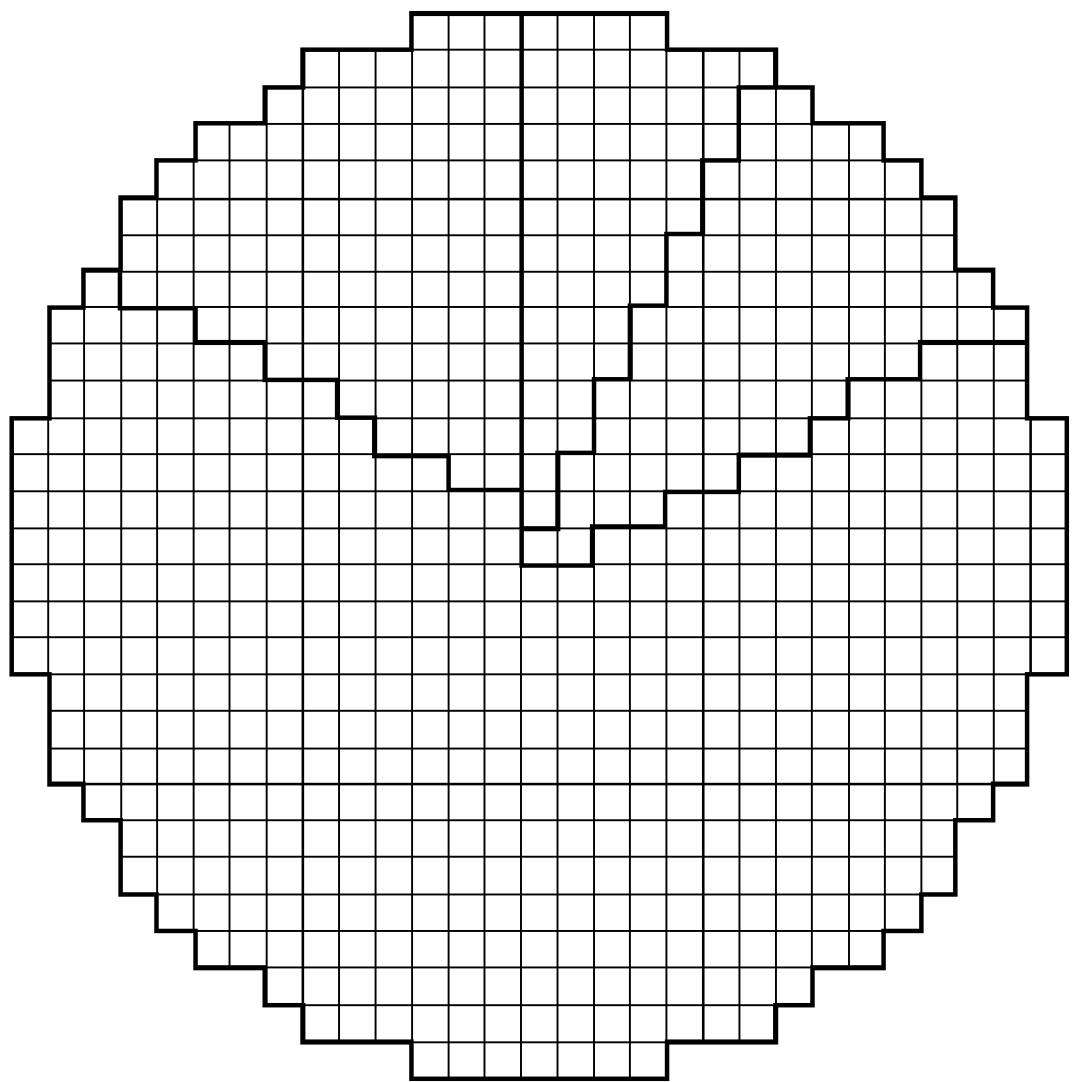
FIG. 9 is a view of the appearance of a display portion of the portion of the apparatus shown in FIG. 1 during performance of the method of the preferred embodiment of the invention at a time later than the time of FIG. 8.

As shown in FIG. 9, slice 3 (the slice representing third value 8) has the following start and stop angles.

$STOP_3=START_2=30$ degrees $START_3=STOP_3-ANGLE_3=30-240=-210$ degrees or +150 degrees Slice 4 (the slice representing fourth value 2) has the following start and stop angles.

$STOP_4=START_2=-210$ degrees $START_4=STOP_4-ANGLE_4=-210-60=-270$ degrees or +90 degrees.

Once all of the line segments forming each slice of the pie have been identified by storing the x coordinates of the end pixels of each line, and the Y coordinate of the line, in an array in computer memory, a DIV is created for each of the line segments. The class of each DIV is the slice number, e.g. "1" for slice 1. The DIV is given absolute positioning, so its position and size are solely determined by the dimensions calculated from the scan line itself.

Each DIV has a color which is also dependent on the slice number. The "slice colors" can be specified programmatically as an array of colors, or obtained from a cascading style sheet. In either case, if there are more slices than colors, the modulus function is used to loop back to the beginning of the list of colors after the all of the colors in the list have been used in respective slices.

Figure 10:
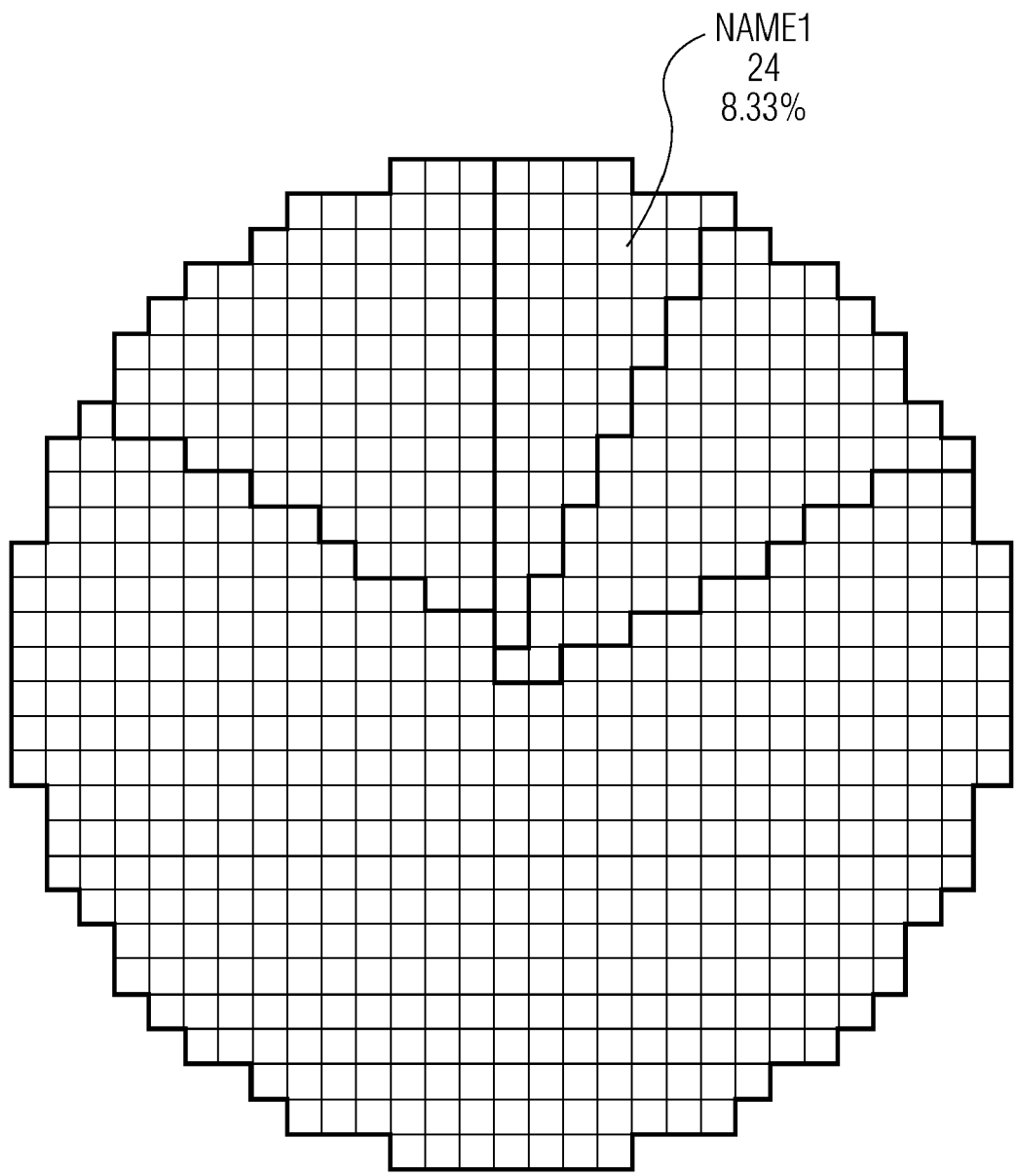
FIG. 10 is a view of the appearance of a display portion of the portion of the apparatus shown in FIG. 9 illustrating further features of the method of the preferred embodiment of the invention.

The code for creating the DIV elements provides an option for specifying event-handling attributes. For example, to enable mouse rollover (tool tip) functionality, the onmouseover and onmouseout attributes are set to Javascript® functions. The first function, assigned to onmouseover, sets the text of a normally invisible, absolutely positioned "tool tip DIV" to show the name of the slice, its value and its percentage of the total as shown in FIG. 10. The function also positions the DIV relative to the mouse and then makes it visible. The function assigned to onmouseout simply makes the tool tip DIV invisible again.

A similar technique can be used to assign a function which puts up a small alert displaying descriptive information about a slice whenever the user double-clicks any of the DIVs included in the slice.

Finally, the DIVs are used to represent each slice using standard DHTML techniques (absolutely positioned DIV elements), which are appended to the current web page and therefore automatically drawn by the browser.

Instead of storing the coordinates of the end pixels of each line in the pie, it is possible to define each rectangle of adjacent horizontal lines having the same length by storing the coordinates of the upper leftmost pixel in the rectangle, and the height and width of the rectangle. From this information, it is possible to calculate the coordinates of all pixels in the rectangle.

It is to be appreciated that the foregoing is a description of a preferred embodiment of the invention to which modifications may be made without departing from the spirit and scope of the invention.

What is claimed is:

1. A method of drawing a pie chart with slices, each of which has an area proportional to the value of one datum of a group of data, on an Internet web page made visible on the display of a computer by illuminating pixels of the display, comprising storing in a pie definition array in computer memory representations of subsets of said pixels, the pixels in each of said subsets forming a horizontal line, the horizontal lines of all of said subsets collectively approximating the appearance of a pie when their pixels are illuminated on said display, for each slice, identifying all segments of each of said horizontal lines containing adjacent pixels to be included in said slice, and for each slice, illuminating the pixels in each of said identified segments to impart to said slice an appearance different from the appearance of all slices immediately adjacent thereto.

2. A method of drawing a pie chart with slices according to claim 1, wherein said pie chart is circular, comprising for each horizontal line of pixels intersecting a 45 degree arc of the circumference of the circular pie, determining a set of coordinates (x,y) of one pixel on said arc, for each set of coordinates (x,y), storing in computer memory data indicative of the locations of the horizontal lines [(-x, y), (x,y)], [(-x,-Y), (x,-y)], [(-y,x), (y,x)], [(-y,-x), (y,-x)], [(-y, x-1), (-y, x-1)], [(-y,-x+1), (y,-x+1)], . . . [(-y,x-n), (y,x-n)], [(-y,-x+n), (y,-x+n)], [(-y,0), (y,0)], where $0<=n<=x$.

3. A method of drawing a pie chart with slices according to claim 1 wherein the coordinates of the end pixels of each of said horizontal lines are stored in said pie definition array.

4. A method of drawing a pie chart with slices according to claim 1 wherein the coordinates of one end pixel of each rectangle formed by adjacent horizontal lines having the same number of pixels is stored in said pie definition array with a representation of the number of pixels in each line of the respective rectangle, and a representation of the number lines in the respective rectangle.

5. A method of drawing a pie chart with slices according to claim 1 wherein the coordinates of the end pixels of each of the segments in a slice are stored in a slice definition array.

6. A method of drawing a pie chart with slices according to claim 5 wherein the x coordinates of the end pixels of each of the segments in a slice are stored in the slice definition array with the y coordinate of the horizontal line in which the segments are contained.

7. A method of drawing a pie chart with slices according to claim 1 further comprising, for each slice, storing a start angle defining one radial border of said slice and a stop angle defining another radial border of said slice, said radial borders subtending an angle proportional to the value the datum corresponding to said slice.

8. A method of drawing a pie chart with slices according to claim 7 comprising determining whether each slice contains more than one segment of the same horizontal line of pixels as a function of the start angle and stop angle of the slice.

9. A method of drawing a pie chart with slices according to claim 8 further comprising computing the difference between the start angle and the stop angle and determining whether the radial borders of the slice are on the same side of a center horizontal line of said pie, said slice containing more than one segment of at least one horizontal line only if the difference between its start angle and the stop angle is greater than 180 degrees and the radial borders of the slice are on the same side of said center horizontal line of said pie.

10. A method of drawing a pie chart with slices according to claim 8 further comprising
determining the quadrant of the pie of the start angle of a slice,
determining the quadrant of the pie of the stop angle of said slice,
said slice containing more than one segment of the same horizontal line of pixels if the start angle of said slice is in the first quadrant of the pie and the stop angle of said slice is in the fourth quadrant of the pie, or the start angle of said slice is in the third quadrant of the pie and the stop angle of said slice is in the second quadrant of the pie.

11. A method of drawing a pie chart with slices according to claim 1 wherein all segments of each of said horizontal lines containing adjacent pixels to be included in each slice are identified by,
for each line in said pie, starting with a first terminal pixel at one end of said line, testing each pixel in said line, in sequence, for inclusion in said slice until the last tested pixel is a pixel in said slice,
storing in computer memory coordinates of a first boundary pixel on a border of said slice, said coordinates of said first boundary pixel being respectively equal to the coordinates of the last tested pixel in said slice,
continuing with a second terminal pixel at an opposite end of said line and testing each adjacent pixel in said line, in sequence, for inclusion in said slice until the last tested pixel is a pixel in said slice,
storing in computer memory coordinates of a second boundary pixel on a border of said slice, said coordinates of said second boundary pixel being respectively equal to the coordinates of the last tested pixel in said slice,
said first and second boundary pixels and all pixels on said line therebetween constituting a segment of said horizontal line in said slice.

12. A method of drawing a pie chart with slices according to claim 1 wherein all segments of each of said horizontal lines containing adjacent pixels to be included in each slice are identified by,
determining a start angle for said slice,
determining a stop angle for said slice,
and determining the pixels to be included in said slice as a function of said start angle and said stop angle.

13. A method of drawing a pie chart with slices according to claim 12 further comprising,
in response to said start angle being less than 90 degrees and said stop angle being greater than 270 degrees,
for each horizontal line in said pie having a positive y coordinate, starting with a first terminal pixel at one end of said line, testing each pixel in said line, in sequence, for inclusion in said slice until the last tested pixel is a pixel in said slice,
storing in computer memory coordinates of a first boundary pixel on a border of said slice, said coordinates of said first boundary pixel being respectively equal to the coordinates of the last tested pixel in said slice,
continuing with a second terminal pixel at an opposite end of said line and testing each adjacent pixel in said line, in sequence, for inclusion in said slice until the last tested pixel is a pixel in said slice,
storing in computer memory coordinates of a second boundary pixel on a border of said slice, said coordinates of said second pixel being respectively equal to the coordinates of the last tested pixel in said slice,
starting with a pixel proximate the Y-axis of said pie and, moving in a horizontal direction toward said first boundary pixel, testing each adjacent pixel in said line, in sequence, for inclusion in said slice until the last tested pixel is a pixel in said slice,
storing in computer memory coordinates of a third boundary pixel on a border of said slice, said coordinates of said third second pixel being respectively equal to the coordinates of the last tested pixel in said slice,
starting with a pixel adjacent said pixel proximate the Y-axis of said pie and closer to said second boundary pixel than said pixel adjacent said pixel proximate the Y-axis, moving in a horizontal direction toward said second boundary pixel, testing each adjacent pixel in said line, in sequence, for inclusion in said slice until the last tested pixel is a pixel in said slice,
storing in computer memory coordinates of a fourth boundary pixel on a border of said slice, said coordinates of said fourth pixel being respectively equal to the coordinates of the last tested pixel in said slice,
said first and third boundary pixels and all pixels on said line therebetween constituting a first segment of said horizontal line in said slice, and
said second and fourth boundary pixels and all pixels on said line therebetween constituting a second segment of said horizontal line in said slice, and
for horizontal lines of said pie which have a zero or negative y coordinate,
for each line in said pie, starting with a first terminal pixel at one end of said line, testing each pixel in said line, in sequence, for inclusion in said slice until the last tested pixel is a pixel in said slice,
storing in computer memory coordinates of a fifth boundary pixel on a border of said slice, said coordinates of said fifth boundary pixel being respectively equal to the coordinates of the last tested pixel in said slice,
continuing with a second terminal pixel at an opposite end of said line and testing each adjacent pixel in said line, in sequence, for inclusion in said slice until the last tested pixel is a pixel in said slice,
storing in computer memory coordinates of a sixth boundary pixel on a border of said slice, said coordinates of said sixth boundary pixel being respectively equal to the coordinates of the last tested pixel in said slice,
said fifth and sixth boundary pixels and all pixels on said line therebetween constituting a segment of said horizontal line in said slice.

14. A method of drawing a pie chart with slices according to claim 12 further comprising,
in response to said start angle being greater than 90 degrees and less than 180 degrees, and stop angle being greater than 180 degrees and less than 270 degrees,
for each horizontal line of said pie having a negative y coordinate, starting with a first terminal pixel at one end of said line, testing each pixel in said line, in sequence, for inclusion in said slice until the last tested pixel is a pixel in said slice,
storing in computer memory coordinates of a first boundary pixel on a border of said slice, said coordinates of said first boundary pixel being respectively equal to the coordinates of the last tested pixel in said slice,
continuing with a second terminal pixel at an opposite end of said line and testing each adjacent pixel in said line, in sequence, for inclusion in said slice until the last tested pixel is a pixel in said slice, storing in computer memory coordinates of a second boundary pixel on a border of said slice, said coordinates of said second pixel being respectively equal to the coordinates of the last tested pixel in said slice, starting with a pixel proximate the Y-axis of said pie and, moving in a horizontal direction toward said first boundary pixel, testing each adjacent pixel in said line, in sequence, for inclusion in said slice until the last tested pixel is a pixel in said slice, storing in computer memory coordinates of a third boundary pixel on a border of said slice, said coordinates of said third second pixel being respectively equal to the coordinates of the last tested pixel in said slice, starting with a pixel adjacent said pixel proximate the Y-axis of said pie and closer to said second boundary pixel than said pixel adjacent said pixel proximate the Y-axis, moving in a horizontal direction toward said second boundary pixel, testing each adjacent pixel in said line, in sequence, for inclusion in said slice until the last tested pixel is a pixel in said slice, storing in computer memory coordinates of a fourth boundary pixel on a border of said slice, said coordinates of said fourth pixel being respectively equal to the coordinates of the last tested pixel in said slice, said first and third boundary pixels and all pixels on said line therebetween constituting a first segment of said horizontal line in said slice, and said second and fourth boundary pixels and all pixels on said line therebetween constituting a second segment of said horizontal line in said slice, and for horizontal lines of said pie which have a zero or positive y coordinate, for each line in said pie, starting with a first terminal pixel at one end of said line, testing each pixel in said line, in sequence, for inclusion in said slice until the last tested pixel is a pixel in said slice, storing in computer memory coordinates of a fifth boundary pixel on a border of said slice, said coordinates of said fifth boundary pixel being respectively equal to the coordinates of the last tested pixel in said slice, continuing with a second terminal pixel at an opposite end of said line and testing each adjacent pixel in said line, in sequence, for inclusion in said slice until the last tested pixel is a pixel in said slice, storing in computer memory coordinates of a sixth boundary pixel on a border of said slice, said coordinates of said sixth boundary pixel being respectively equal to the coordinates of the last tested pixel in said slice, said fifth and sixth boundary pixels and all pixels on said line therebetween constituting a segment of said horizontal line in said slice.

15. A method of drawing a pie chart with slices according to claim 12 further comprising, in response to said start angle being less than 90 degrees and said stop angle being greater than 270 degrees, for horizontal lines of said pie which have a positive y coordinate, for each line in said pie, starting with a first terminal pixel at one end of said line, testing each pixel in said line, in sequence, for inclusion in said slice until the last tested pixel is a pixel in said slice, storing in computer memory coordinates of a first boundary pixel on a border of said slice, said coordinates of said first boundary pixel being respectively equal to the coordinates of the last tested pixel in said slice, continuing to test the pixels in said line in sequence for inclusion in said slice until the last tested pixel is a pixel not in said slice, storing in computer memory coordinates of a second boundary pixel on a border of said slice, said coordinates of said second boundary pixel being respectively equal to the coordinates of the next to last tested pixel in said slice, continuing with a second terminal pixel at an opposite end of said line and testing each adjacent pixel in said line, in sequence, for inclusion in said slice until the last tested pixel is a pixel in said slice, storing in computer memory coordinates of a third boundary pixel on a border of said slice, said coordinates of said third boundary pixel being respectively equal to the coordinates of the last tested pixel in said slice, continuing to test the pixels in said line in sequence until for inclusion in said slice until the last tested pixel is a pixel not in said slice, storing in computer memory coordinates of a fourth boundary pixel on a border of said slice, said coordinates of said fourth boundary pixel being respectively equal to the coordinates of the next to last tested pixel in said slice, said first and second boundary pixels and all pixels on said line therebetween constituting a first segment of said horizontal line in said slice, and said third and fourth boundary pixels and all pixels on said line therebetween constituting a second segment of said horizontal line in said slice, and for horizontal lines of said pie which have a zero or negative y coordinate, for each line in said pie, starting with a first terminal pixel at one end of said line, testing each pixel in said line, in sequence, for inclusion in said slice until the last tested pixel is a pixel in said slice, storing in computer memory coordinates of a fifth boundary pixel on a border of said slice, said coordinates of said fifth boundary pixel being respectively equal to the coordinates of the last tested pixel in said slice, continuing with a second terminal pixel at an opposite end of said line and testing each adjacent pixel in said line, in sequence, for inclusion in said slice until the last tested pixel is a pixel in said slice, storing in computer memory coordinates of a sixth boundary pixel on a border of said slice, said coordinates of said sixth boundary pixel being respectively equal to the coordinates of the last tested pixel in said slice, said fifth and sixth boundary pixels and all pixels on said line therebetween constituting a segment of said horizontal line in said slice.

16. A method of drawing a pie chart with slices according to claim 12 further comprising, in response to said start angle being greater than 90 degrees and less than 180 degrees, and stop angle being greater than 180 degrees and less than 270 degrees, for horizontal lines of said pie which have a negative y coordinate, for each line in said pie, starting with a first terminal pixel at one end of said line, testing each pixel in said line, in sequence, for inclusion in said slice until the last tested pixel is a pixel in said slice, storing in computer memory coordinates of a first boundary pixel on a border of said slice, said coordinates of said first boundary pixel being respectively equal to the coordinates of the last tested pixel in said slice, continuing to test the pixels in said line in sequence until for inclusion in said slice until the last tested pixel is a pixel not in said slice, storing in computer memory coordinates of a second boundary pixel on a border of said slice, said coordinates of said second boundary pixel being respectively equal to the coordinates of the next to last tested pixel in said slice, continuing with a second terminal pixel at an opposite end of said line and testing each adjacent pixel in said line, in sequence, for inclusion in said slice until the last tested pixel is a pixel in said slice, storing in computer memory coordinates of a third boundary pixel on a border of said slice, said coordinates of said third boundary pixel being respectively equal to the coordinates of the last tested pixel in said slice, continuing to test the pixels in said line in sequence until for inclusion in said slice until the last tested pixel is a pixel not in said slice, storing in computer memory coordinates of a fourth boundary pixel on a border of said slice, said coordinates of said fourth boundary pixel being respectively equal to the coordinates of the next to last tested pixel in said slice, said first and second boundary pixels and all pixels on said line therebetween constituting a first segment of said horizontal line in said slice, and said third and fourth boundary pixels and all pixels on said line therebetween constituting a second segment of said horizontal line in said slice, and for horizontal lines of said pie which have a zero or positive y coordinate, for each line in said pie, starting with a first terminal pixel at one end of said line, testing each pixel in said line, in sequence, for inclusion in said slice until the last tested pixel is a pixel in said slice, storing in computer memory coordinates of a fifth boundary pixel on a border of said slice, said coordinates of said fifth boundary pixel being respectively equal to the coordinates of the last tested pixel in said slice, continuing with a second terminal pixel at an opposite end of said line and testing each adjacent pixel in said line, in sequence, for inclusion in said slice until the last tested pixel is a pixel in said slice, storing in computer memory coordinates of a sixth boundary pixel on a border of said slice, said coordinates of said sixth boundary pixel being respectively equal to the coordinates of the last tested pixel in said slice, said fifth and sixth boundary pixels and all pixels on said line therebetween constituting a segment of said horizontal line in said slice.

* * * * *